United States Patent [19]

Smith, Jr.

[11] Patent Number: 4,935,850
[45] Date of Patent: Jun. 19, 1990

[54] SPEEDOMETER DISPLAY HAVING FIBER OPTIC ILLUMINATION SYSTEM

[76] Inventor: Ernest E. Smith, Jr., 2900 Airport Rd., Pascagoula, Miss. 39567

[21] Appl. No.: 190,759

[22] Filed: May 6, 1988

[51] Int. Cl.⁵ ............................................. F21V 8/00
[52] U.S. Cl. ..................................... 362/27; 362/32
[58] Field of Search ................... 362/23, 26, 27, 29, 362/30, 32

[56] References Cited

U.S. PATENT DOCUMENTS

| | | | |
|---|---|---|---|
| 2,060,427 | 11/1936 | Robinson | 362/29 X |
| 2,108,342 | 2/1938 | Le Fevre | 362/29 X |
| 2,165,498 | 7/1939 | Moody | 362/30 X |
| 2,286,737 | 6/1942 | Hilt | 362/30 X |
| 3,857,361 | 12/1974 | Gibson et al. | 116/302 X |

Primary Examiner—Ira S. Lazarus
Assistant Examiner—Richard R. Cole
Attorney, Agent, or Firm—Alexander F. Norcross

[57] ABSTRACT

A speedometer display is disclosed having a front, opaque indicator dial upon which are provided numeric and scale mark indication which are constructed of transparent, parallel fiber optic bundles extending transversely through the opaque display. Parallel to and behind the display, a light interrupter plate having a reflective surface adjacent the fiber optic bundles is rotationally attached to the speedometer needle shaft for rotation. Immediately behind and parallel to this interrupter plate is a color filter segment plate having a plurality of color filters which are back illuminated by artificial illumination means. The speedometer marks and numbers corresponding to speeds to the right of a given speedometer needle position are illuminated by reflected ambient light transmitted through the fiber optic bundles and reflected from the interrupter plate. Those marks and numbers to the left of the speedometer needle are illuminated by transmitted back light which passes through the filter segments and illuminates the back portion of the numeric and mark fiber optic bundles as they are uncovered by rotation of the interrupter plate. The provision of a plurality of filter elements allows progressive color coding of each segment to indicate varying degrees of operator caution as the rate shown increases.

6 Claims, 2 Drawing Sheets

SPEEDOMETER DISPLAY HAVING FIBER OPTIC ILLUMINATION SYSTEM

BACKGROUND OF THE INVENTION

This invention relates to an illuminated speedometer display or speed indicator display.

Every automobile, and most operating machinery having the necessity of an operator governing its speed of operation, contains some means of visual depiction of the relative speed of operation of the machine in comparison to some standard. Thus, the standard automobile speedometer indicates the speed of travel of the automobile, usually in miles per hour over the road, and legal limits are established with regard to this measurement. In order to emphasize the importance of and to ease the operator's burden in determining the performance against these speed ranges of the machine, various illumination methods have been developed for illuminating the scales of such displays.

Thus, U.S. Pat. No. 3,654,452 to Frey discloses an instrument panel for motor vehicles in which a remote light source is provided. Light is conducted to the various instruments and indicators on the instrument panel by means of a glass fiber cable or fiber optic cable, which may be divided to provide patterns of illumination for the purpose of illuminating strips along an arm.

A significant number of patents relate to the illumination of instruments by the use of lights in conjunction with light pipes. In this context U.S. Pat. No. 3,216,294 to Blackwell discloses an illuminated indicating instrument in which a light pipe structure is disclosed for illuminating a plastic transparent pointer on the face of the instrument. The invention discloses the use of multiple illuminating lamps as a failure protection mode against the burnout of a single lamp. The invention also teaches that various colored lights may be used, providing different uniform colorations of light through the light pipe to the instrument.

U.S. Pat. No. 2,902,770 to Kadlec shows the construction of a light-transmitting dial pointer having a multiple part construction so that it may be illuminated at night and so that in the daytime it presents a high contrast color visibility from reflection.

U.S. Pat. No. 4,180,847 to Cresko discloses a light pipe construction in which the reflectance of light at the visible end of the pipe is highly attenuated so as to give an unambiguous light or dark (on/off) indication either at night under artificial light or in the daytime under high ambient daytime illumination.

U.S. Pat. No. 4,321,655 to Bouverand teaches the use and construction of a dashboard indicator in which essentially the entire panel substrate is constructed of a light transmissive material, in which interchangeable extensions are used to provide for the control of illumination.

U.S. Pat. No. 4,621,306 to Sell shows an illuminated instrument panel including a speed indicator in which a light guide plate is used to provide illumination to a liquid crystal display. The construct provides for a liquid crystal display including, in the depicted version, a speed indicating instrument in which color is provided. The patent teaches color coding of the light display to indicate varying conditions based upon a varying overall display color; the device is described as being suitable as an automotive instrument display.

U.S. Pat. No. 4,216,524 to Leveraus shows an alternate form of display panel in which positioning of lights driven by integral cables is used in lieu of fiber optics.

Finally, U.S. Pat. No. 3,857,361 to Gibson discloses as part of a display mechanism and a television tuner concept a mechanism which interposes a moveable mask between a light pipe source and a receiving series of fiber optic cables so that as the mask is rotated, varying displays are presented upon a flat, illuminated face showing a condition or information to the user.

SUMMARY OF THE INVENTION

The invention discloses a structure for a speedometer indicator dial which permits the highlighting of numeric values and scales on the dial by means of reflected incident light upon the dial face but which also provides for the successive illumination, simultaneously and in line with the direction of the speedometer speed indicator pointer of both the numeric values and the speed scale upon the dial. Furthermore, the dial provides for the use of multiple color codes indicating increasing speeds culminating in the use of an alerting color code to indicate the existence of a speed above 65 miles an hour, the maximum legal speed known to now exist on the United States highway system.

The dial is built in the structure of three parallel, half circular plates, mounted along the needle shaft axis of a speedometer structure.

The rearmost plate has segmented, transparent color filter sections which are back illuminated by one or more incandescent back lights. This color segmentation filter plate is fixed in position, oriented in conjunction with the fixed numbers and scales on the indicator face of the speedometer.

Between the rearmost plate and the display face plate is a middle interrupter plate which is joined to the speedometer needle axis and rotates in conjunction therewith. This plate is positioned so that at zero speed (0 miles an hour) it is interposed between all of the color filters in the rearmost plate and all of the display members in the face plate preventing any passage of back illumination. As the speedometer needle progressively increases in angular position, representing increases in speed, the interrupter plate rotates progressively, uncovering the colored filter members and permitting the passage of colored light from the illumination source through the filter member onto the display face plate.

The third, display face plate, is an opaque plate containing therein groups of fiber optic bundles which are formed to create back lit numbers and index marks. These bundles are progressively illuminated as the interrupter plate turns in coordination with the speedometer needle. The fiber bundles representing numeric indications to the left of the needle are illuminated and shine with the desired color, indicating the relative speed achieved.

Along an outer arcuate segment of the interrupter plate, on the side facing the display face plate, is a highly reflective surface so that ambient outside light striking the numbers and marks on the face plate will be transmitted to the interrupter plate and then reflected back, permitting the numbers and marks to the right of the needle to be visible against the opaque face plate.

The actual mechanism for rotating the needle and the dial remains the speedometer mechanism well known in the art.

It is thus an object of this invention to provide a speedometer indicator which is capable of progressive, illuminated indication coordinated to the actual speed achieved display.

It is a further object of this invention to provide a speedometer dial plate which is capable of providing multiple varying color codes depending upon the speed being indicated for the purposes of alerting the user to the occurrence of high or dangerous speeds.

It is a further object of this invention to provide a speedometer indicator which permits the use of visual cues in addition to the angular position of a speedometer needle to communicate more clearly the speed being indicated thereupon.

This and other objects of the invention will be more clear from the detailed description of the preferred embodiment which follows.

DETAILED DESCRIPTION OF THE PREFERRED EMBODIMENT

Figure 1:
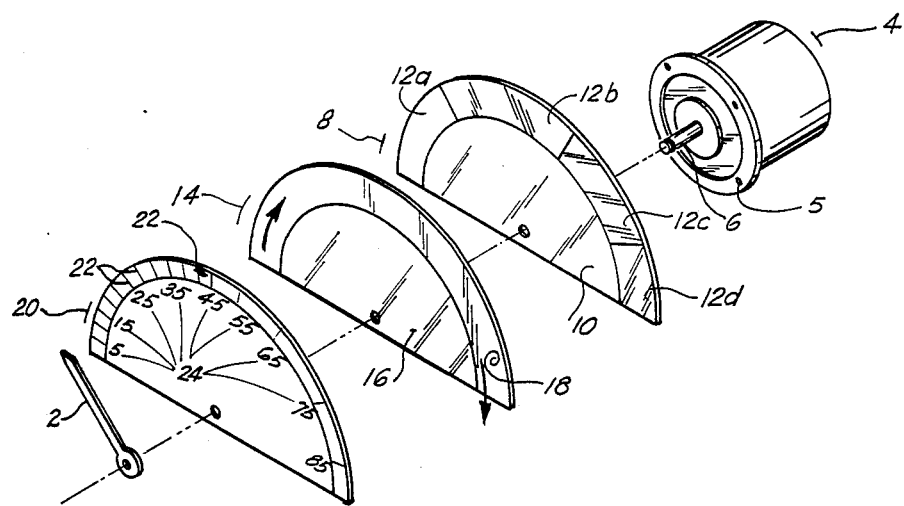
FIG. 1 depicts an exploded view of the three semicircular segments of the invention journaled upon a drive and indicator pointer for a speedometer.

Referring to FIG. 1, the innovative speedometer dial of the invention is shown as comprising a speedometer needle or pointer 2 mounted for rotation upon the shaft of a speedometer servo driver 4. The operation of such an electro-mechanical driver is well understood in the art and will not be further discussed here, save that such a drive angularly positions its shaft and therefore the pointer at a position directly related to the speed being indicated by the speedometer.

Mounted in parallel along the servo shaft axis 6 are:
a. At the rear of the speedometer dial, closest to the servo 4 rear filter segment 8. Rear segment 8 is fixed in position as is the servo housing 5 and does not rotate. Rear segment 8 comprises an inner, non-reflective, preferably black, support arc 10 which in turn supports a circumferential series of filter segments 12. Each of filter segments 12 is a transparent monochromatic color filter, passing a single color or passing white light, as chosen by the designer for the desired illumination effect to be achieved.
b. Immediately forward of and parallel to rear filter segment 8, of an equal radius thereto, but attached for rotation to servo shaft 6 is interrupter plate 14. Interrupter plate 14 comprises an inner non-reflective semi-circular surface 16 and an outer arcuate reflective segment 18 which faces forward against
c. A third, outer display face 20. Display face 20 is a semi-circular segment parallel to and of equal radius to interrupter plate 14 and rear filter segment 8. Display face 20 is opaque save that along a semicircular arc of display face 20 adapted to correspond to reflective surface 18 on interrupter plate 14, are provided a plurality of marks 22 indicating a speed scale together with a series of spaced numbers 24, for example at every five miles per hour, designating those of the marks corresponding to the numeric speeds, all as is well known in the art of speedometer construction.

Within the invention, however, each of the scale marks 22 and the numeric designations 24 are constructed by imbedding shaped, parallel, fiber optic bundles 26 having light transmission edges at both the front face 28 and the rear face 30 of display face 20. Fiber optic bundles 26 are individually shaped and imbedded so as to form the various scale marks 22 and the various numeric members 24 and run parallel transverse to the plane of display face 20 so that a mirror image of said marks and numbers would be seen to appear upon rear face 30 of the speedometer display. This area of active rear fiber optic faces 32 is parallel to and directly adjacent to reflective surface 18 of interrupter plate 14.

Figure 2:
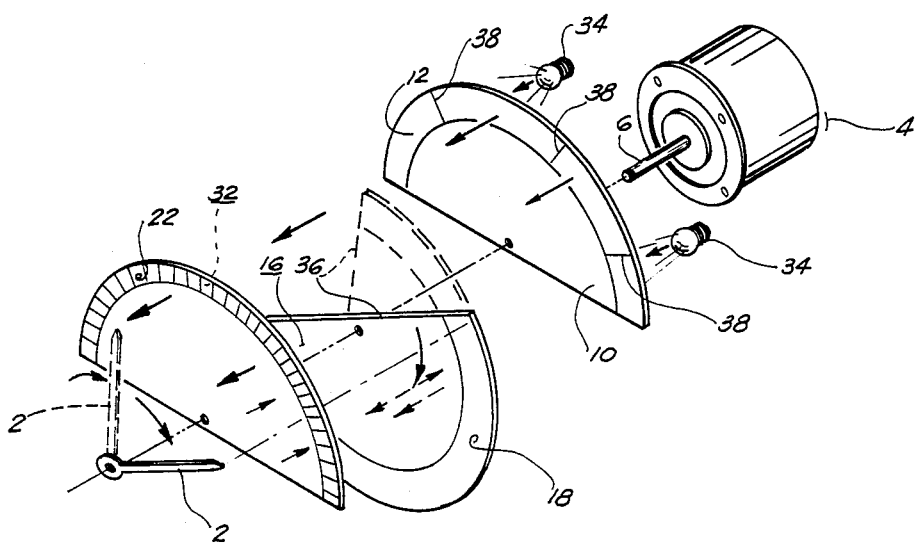
FIG. 2 shows the positioning actuation of the interrupter plate and the resulting illumination patterns upon the dial of the speedometer.
Figure 3:
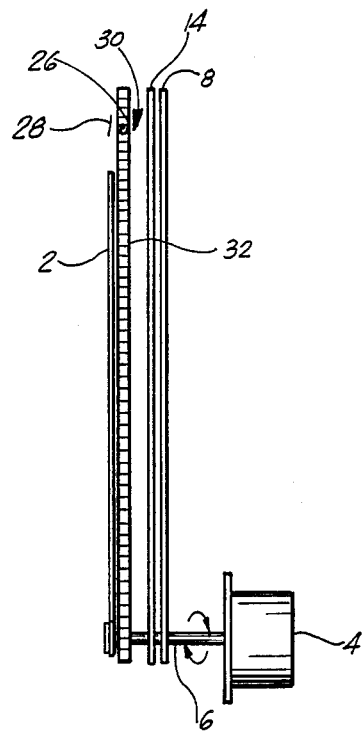
FIG. 3 is a side view of the invention as assembled.
Figure 4:
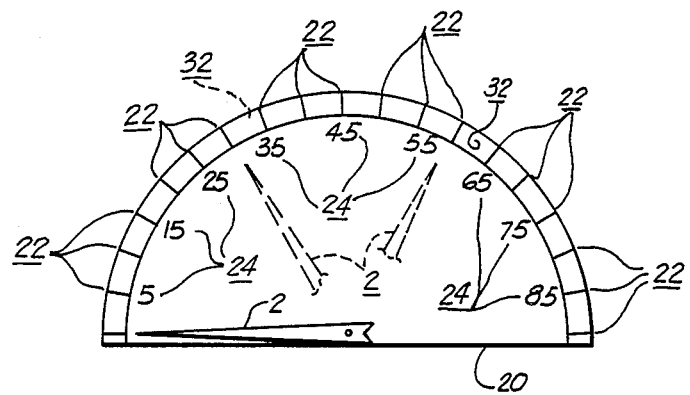
FIG. 4 is a face view of the invention as assembled.

Referring to FIG. 2, in use, at a zero speed, or for all numbers and marks corresponding to speeds greater than the actual indicated speed shown by the speedometer, incident light bearing upon display face 20 is not reflected from the opaque display face; where it is incident upon the front face 28 of the fiber optic bundles 26, it is transmitted through the fiber optic bundles and emitted from rear face 30. This light is immediately reflected by reflective surface 18 and reappears through the fiber optic bundle providing them with a contrasting lit appearance so that they may be distinguished against the otherwise opaque blank display face 20.

At all times, while the speedometer of the invention is operating, artificial illumination means 34, such as electric bulbs, are providing back light through the individual filter segments 12 on rear filter plate 8. As an increase in speed indication occurs, pointer servo axis 6 rotates carrying with it pointer 2 and rotating interrupter plate 4. Interrupter plate 4 cutoff edge 36 is parallel to and coincident with the position of pointer 2. As cutoff edge 36 rotates, incident light from illumination means 34 passes through the filter segments 12 and is immediately transmitted directly onto the rear faces 30 of the individual fiber optic bundle representing the marks and numbers. The close positioning of filter plate 8 to display face 20 provides for a sharp delineation of these colors so that each segment of speed represented by an arcuate group of adjacent marks 22 and numbers 24 is illuminated by the color corresponding to a specific filter segment 12. Thus in the first embodiment of the invention first filter segment 12A is white, second filter segment 12B is blue, third filter segment 12C is yellow and fourth filter segment 12D is red. The dividing lines 38 between filter segments 12 may be chosen by the designer to correspond to any desired division points between relative speeds to indicate differing conditions of use. Thus for instance, white can represent that segment of speed which is generally considered as a cautious and prudent speed under almost all circumstances as, for instance, up to 25 miles an hour, the typical speed in school zones. Blue can represent that range of speeds, as say, between 25 and 45 miles an hour, typical in urban environments, and yellow can represent that speed between 45 and 65 miles an hour, representing, for example, those speeds at which caution should be observed which are safe on interstate highways and in rural areas under best driving conditions. Red can represent speeds which are generally considered illegal and unsafe in all driving areas within the United States. Similar usage variations exist in all operating machinery capable of varying speeds and such adaptions will be obvious to the designer.

Thus, as the speed increases, the back illumination of the speedometer provides multiple color coding associated with the related marks and numbers as the pointer progresses across the speed dial, which gives a visual cue to the operator supplementing the actual illuminated numeric and mark values as to the relative speed of passage of the automobile. By utilizing colors that are generally recognized as indicating caution or danger for the higher speed ranges, the driver can additionally be cautioned as these higher unsafe speeds.

Various options are, of course, available. It has been found, for instance, that the indicator plate and the lighting plate can be optically shaped through experimentation to maximize reflection and also transmission of filter light to the fiber optic bundles. It is also found that pointer 2 is best scaled down in size inasmuch as the back lighting effect provides an equally effective indication of exact speed. It has also been found that the size of the numeric indicators 24 can best be increased over the size typical in speedometers of the current art and a 25 percent increase in size would be considered desirable to maximize the effect of back illumination of the numeric value.

All internal surfaces, save for the reflective arc on the indicator plate, should be blackened to prevent stray reflection and blurring of the light colors.

It is, of course, obvious that the colors can be changed and positioned in color coding to suit the specific indicator needs for the speed instrument and it is also obvious that the instrument is suitable for any instrument indicating a relative continuous condition, such as an RPM meter, or a machine rate of progress meter. Thus, the invention is not restricted to automotive speedometer dials, but rather to that wider range of indicators where a continuous indication of a rate of use is required together with some form of cuing the operator as to progression into higher rates of operation where more caution must be exercised by the operator.

It should thus be apparent that the invention is not restricted to the exact embodiment here disclosed but rather to that wider range of equivalents that are implicit in the claims.

I claim:

1. A progressively illuminated speed indicator comprising:
    an arcuate display having thereon scaled marks corresponding to a progressive indication of speed;
    said display further having, periodically adjacent certain said marks, numeric designations corresponding to a scale of speed indicated by each said certain mark;
    the display, exclusive of the marks and numeric designations, being opaque;
    said marks and said numeric designations each comprising a plurality of deformable light transmission means extending from a visible face of said display to a second inner surface, terminating there in a plurality of optically receiving faces corresponding to each said mark or numeric designation;
    means for illuminating said optically receiving faces with light; and
    means intermediate said optically receiving faces and said illumination means for progressively illuminating said marks and said numeric designations corresponding to an increased in speed.

2. A speed indicator as described in claim 1 above wherein said means for illumination further comprises:
    means for filtering illumination of said optically receiving faces, each with a selected one of a number of monochromatic light hues.

3. A speed indicator as described in claim 1 above wherein said means for illuminating further comprises:
    reflective means on said intermediate means for reflecting a substantial portion of ambient light emitted by said faces back into said faces.

4. A speed indicator as described in claim 1 above, wherein said means for illuminating further comprises:
    means for illumination of said optically receiving faces, wherein each said optically receiving face is illuminated with one of a number of monochromatic light hues, by selective filtration of an illumination source.

5. A progressively illuminated speed indicator comprising:
    an arcuate display having thereon scaled marks corresponding to a progressive indication of speed;
    the display, exclusive of the marks and numeric designations, being opaque;
    said marks and said numeric designations each comprising a plurality of deformable light transmission means extending from a visible face of said display to a second inner surface, terminating there in a plurality of optically receiving faces corresponding to each said mark or numeric designation;
    means for illuminating said receiving faces with light; and
    means intermediate said faces and said illumination means for progressively illuminating said marks and said numeric designations corresponding to an increase in speed.

6. A speed indicator as described in claim 5 above wherein said means for illuminating further comprises:
    means for filtering illumination of said optically receiving faces, each with a selected one of a number of monochromatic light hues.

* * * * *